United States Patent
Seol et al.

(10) Patent No.: US 7,433,313 B2
(45) Date of Patent: Oct. 7, 2008

(54) METHOD OF DETERMINING REVERSE DATA RATE IN MOBILE COMMUNICATION SYSTEM

(75) Inventors: Jee Woong Seol, Gunpo-si (KR); Ki Jun Kim, Seoul (KR); Young Woo Yun, Seoul (KR); Soon Yil Kwon, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 737 days.

(21) Appl. No.: 10/843,563

(22) Filed: May 12, 2004

(65) Prior Publication Data

US 2004/0228288 A1    Nov. 18, 2004

(30) Foreign Application Priority Data

May 12, 2003    (KR)    ............ 10-2003-0029965

(51) Int. Cl.
*G01R 31/08* (2006.01)
*H04J 3/22* (2006.01)

(52) U.S. Cl. ........................ 370/235; 370/465

(58) Field of Classification Search .......... 370/437, 370/468, 235, 465, 498, 310
See application file for complete search history.

(56) References Cited

U.S. PATENT DOCUMENTS

| | | | |
|---|---|---|---|
| 6,069,883 A * | 5/2000 | Ejzak et al. | 370/335 |
| 7,161,956 B2 * | 1/2007 | Gollamudi et al. | 370/468 |
| 2002/0186657 A1 * | 12/2002 | Jain et al. | 370/235 |
| 2003/0067907 A1 * | 4/2003 | Rezaiifar et al. | 370/349 |
| 2003/0073443 A1 * | 4/2003 | Bae et al. | 455/450 |
| 2003/0152031 A1 * | 8/2003 | Toskala et al. | 370/236 |
| 2004/0266451 A1 * | 12/2004 | Stolyar et al. | 455/452.2 |
| 2005/0047393 A1 * | 3/2005 | Liu | 370/352 |
| 2006/0105796 A1 * | 5/2006 | Malladi et al. | 455/522 |
| 2006/0264220 A1 * | 11/2006 | Chen et al. | 455/454 |

* cited by examiner

*Primary Examiner*—Seema S. Rao
*Assistant Examiner*—Mon Cheri S Davenport
(74) *Attorney, Agent, or Firm*—Ked & Associates, LLP

(57) ABSTRACT

A method determines the data rate of traffic data to be transmitted from a mobile station to a base station in a mobile communication system, by considering a delay time required for the generation and transfer of data rate control information. The method includes steps of transmitting control information to the base station, the control information corresponding to the traffic data of an ith frame, the ith frame having a predetermined data rate; receiving, in response to the transmitted control information, data rate control information from the base station, the data rate control information including an instruction; and determining a maximum data rate of the traffic data to be transmitted during a next frame, by applying the instruction of the data rate control information to the predetermined data rate of the ith frame.

15 Claims, 5 Drawing Sheets

US 7,433,313 B2

METHOD OF DETERMINING REVERSE DATA RATE IN MOBILE COMMUNICATION SYSTEM

CROSS-REFERENCE TO RELATED APPLICATIONS

This application claims the benefit of Korean Application No. 10-2003-0029965 filed on May 12, 2003, which is hereby incorporated by reference.

BACKGROUND OF THE INVENTION

1. Field of the Invention

The present invention relates to a mobile communication system, and more particularly, to a method of determining the data rate of traffic data to be transmitted from a mobile station to a base station, in which a delay time is considered when assigning the reverse data rate.

2. Discussion of the Related Art

In a contemporary mobile communication system, data is transmitted from a mobile station to a base station using a reverse traffic channel, and a reverse control channel is used to transmit control information corresponding to the traffic data. The control information includes data rate information and mobile station status information, e.g., the currently available traffic channel transmission power and the currently remaining buffer capacity, as well as other data necessary for controlling the data transmission of the traffic channel. This control information is transmitted as a signaling message via the reverse link of a traffic channel and is used in determining, based on the data rate of a previous frame of the reverse link, a data rate for subsequent traffic data. That is, based on previous transmission information, the mobile station transmits to the base station a request for assignment of a data rate, i.e., a change to or the maintenance of the current transmission rate, receives a response from the base station in the form of data rate control information, namely, a rate control bit or RCB, and determines the transmission rate of the next frame based on the received data rate control information.

As described above, a delay time exists between the mobile station's request for a particular data rate and its subsequent transmission of data at that rate. This delay time can be seen in FIG. 1, illustrating a reverse-link data rate determination method according to a related art. During an ith frame, a mobile station transmits control information on the reverse control channel (RCCH) and transmits traffic data on the reverse traffic channel (RTCH). Responding to the control information of frame i, the base station transmits data rate control information on the forward control channel (FCCH) at an (i+α)th frame. The next frame to which the mobile station may apply the data rate control information is an (i+β)th frame, which reflects an overall delay time of β frames. The assigned date rate of the frame i+β, however, is calculated with respect to its immediately preceding frame— that is, an assigned date rate is applied to the rate of the (i+(β−1))th frame—and the mobile station determines the optimal data rate for the transmitting frame accordingly. In doing so, the mobile station calculates an assigned data rate for each frame based on the data rate control information transmitted from the base station, to achieve a maximum transmittable data rate according to a current communication environment.

In the above method of determining a reverse data rate according to a related art, the assigned data rate is a value equal to $\epsilon_{i+\alpha} D_{i+(\beta-1)}$ for every frame i+β, where $\epsilon_{i+\alpha}$ is a data rate transition ratio determined in accordance with the data rate control information of the (i+α)th frame and where $D_{i+(\beta-1)}$ is the transmitted data rate of the (i+(β−1))th frame. Accordingly, as indicated by the arcing arrow in FIG. 1, the transmitted data rate of the (i+(β−1))th frame is referenced to determine the assigned data rate of the (i+β)th frame.

FIG. 2 illustrates a case where the RCB from the base station permits a data rate increase of the reverse traffic channel after transmitting a hold for frames i+1 and i+2. In this example, when the RCB indicates an increase in the transmission rate for frames i+3, i+4, and i+5 and the data rate transition ratio is equal to 2, the assigned data rates for each frame is a doubling of the immediately preceding frame, i.e., frame i+(β−1). Here, the data rate is initially assumed to be a unity value (d=1).

Though the method of the related art considers the current communication environment, there is no provision for the delay time required for the generation and transfer of data rate control information, during which the communication environment is apt to change, and an error is generated as a result. Such an error prevents the base station from fully utilizing a scheduling algorithm for the application of the resource distribution to each mobile station.

SUMMARY OF THE INVENTION

Accordingly, the present invention is directed to a reverse-data-rate determining method that substantially obviates one or more of the problems due to limitations and disadvantages of the related art.

An object of the present invention, which has been devised to solve the foregoing problem, lies in providing a method of determining a reverse data rate, which considers a delay time required for the generation and transfer of data rate control information in addition to the current communication environment.

It is another object of the present invention to provide a method of determining a reverse data rate, in which an optimal data rate is assigned to each frame to be transmitted.

It is another object of the present invention to provide a method of determining a reverse data rate, which enhances the effects a scheduling algorithm for the application of the resource distribution to each mobile station.

It is another object of the present invention to provide a method of determining a reverse data rate, which facilitates the allocation of resources.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of determining a data rate for traffic data to be transmitted from a mobile station to a base station in a mobile communication system. The method comprises steps of transmitting control information to the base station, the control information corresponding to the traffic data of an ith frame, the ith frame having a predetermined data rate; receiving, in response to the transmitted control information, data rate control information from the base station, the data rate control information including an instruction; and determining a maximum data rate of the traffic data to be transmitted during a next frame, by applying the instruction of the data rate control information to the predetermined data rate of the ith frame.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations.

Figure 1:
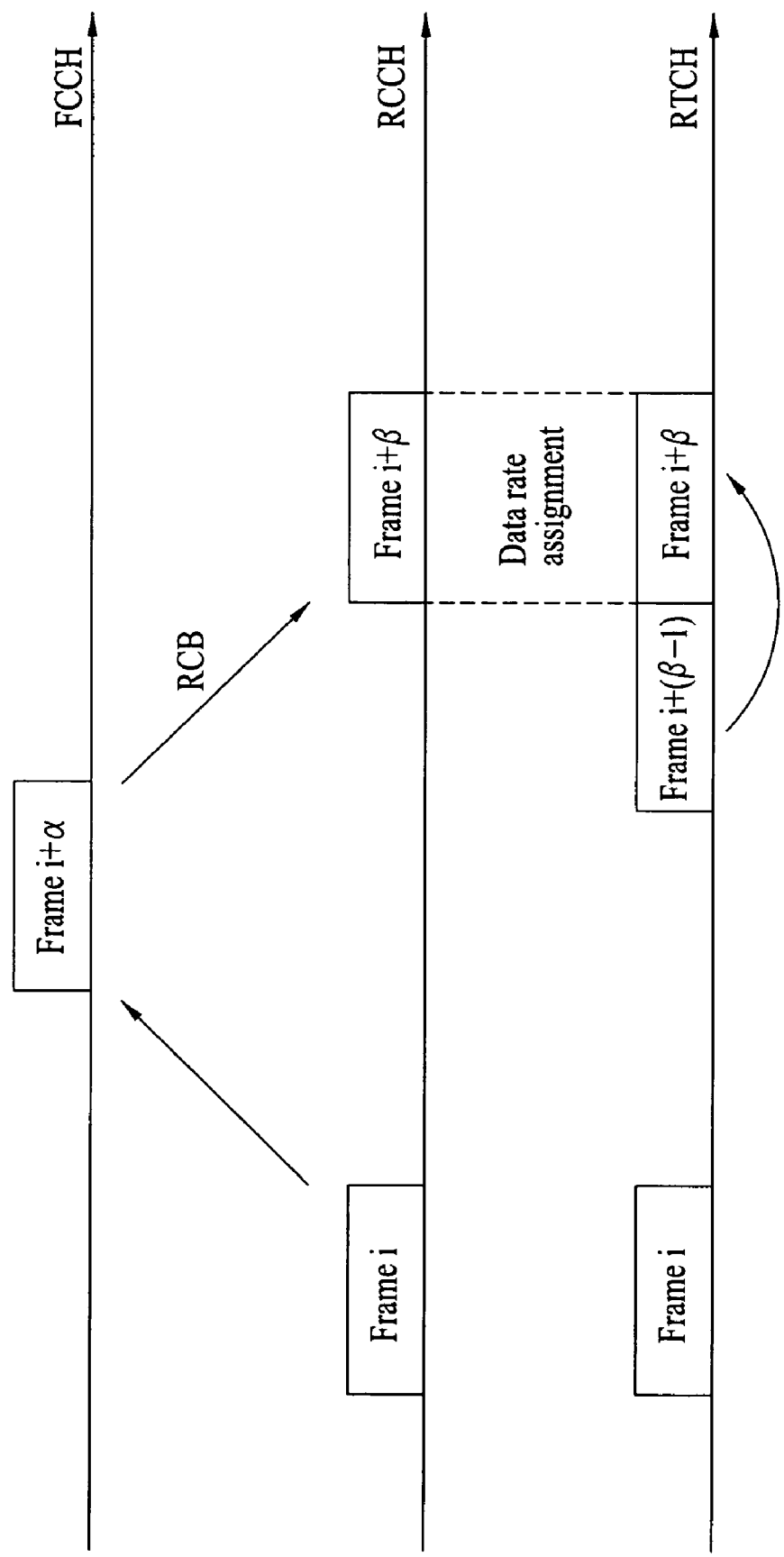
FIG. 1 is timing diagram of a method of determining a reverse data rate according to a related art.
Figure 2:
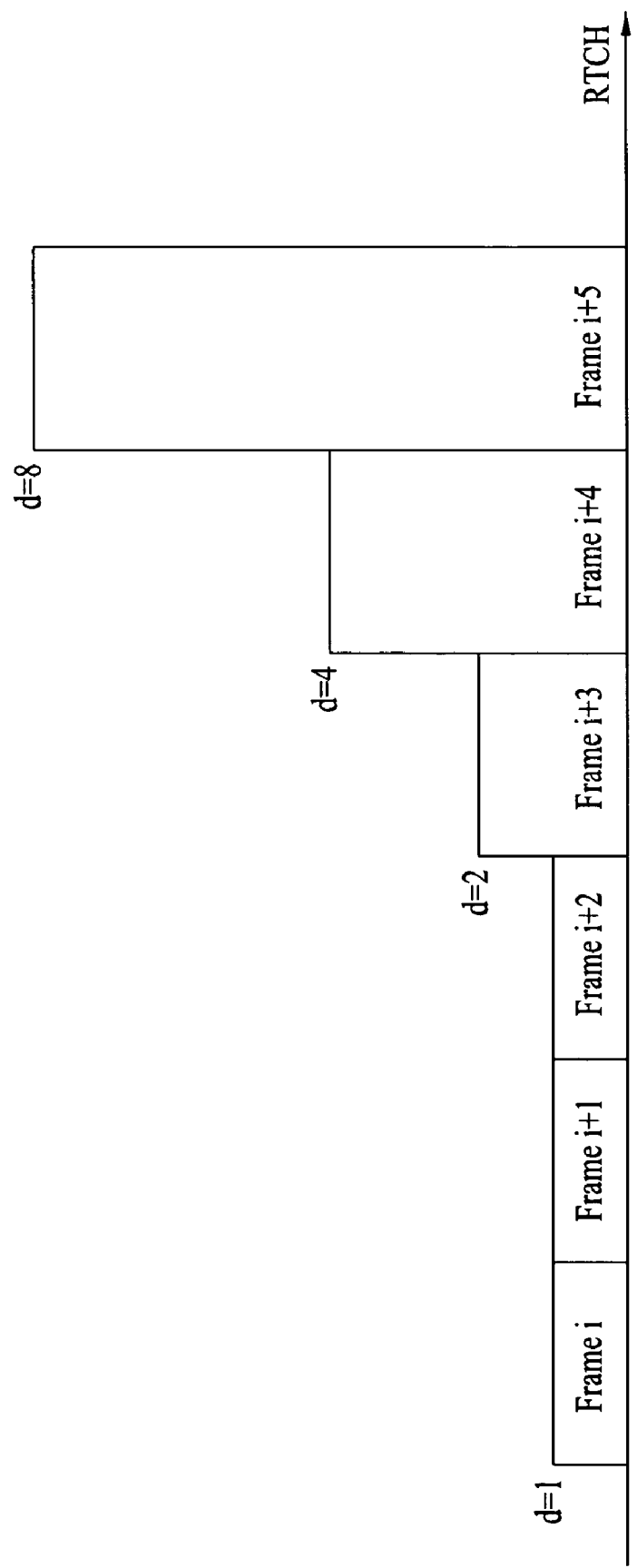
FIG. 2 is a diagram of an exemplary series of data rates determined for a reverse traffic channel of a mobile station adopting the method of FIG. 1.
Figure 3:
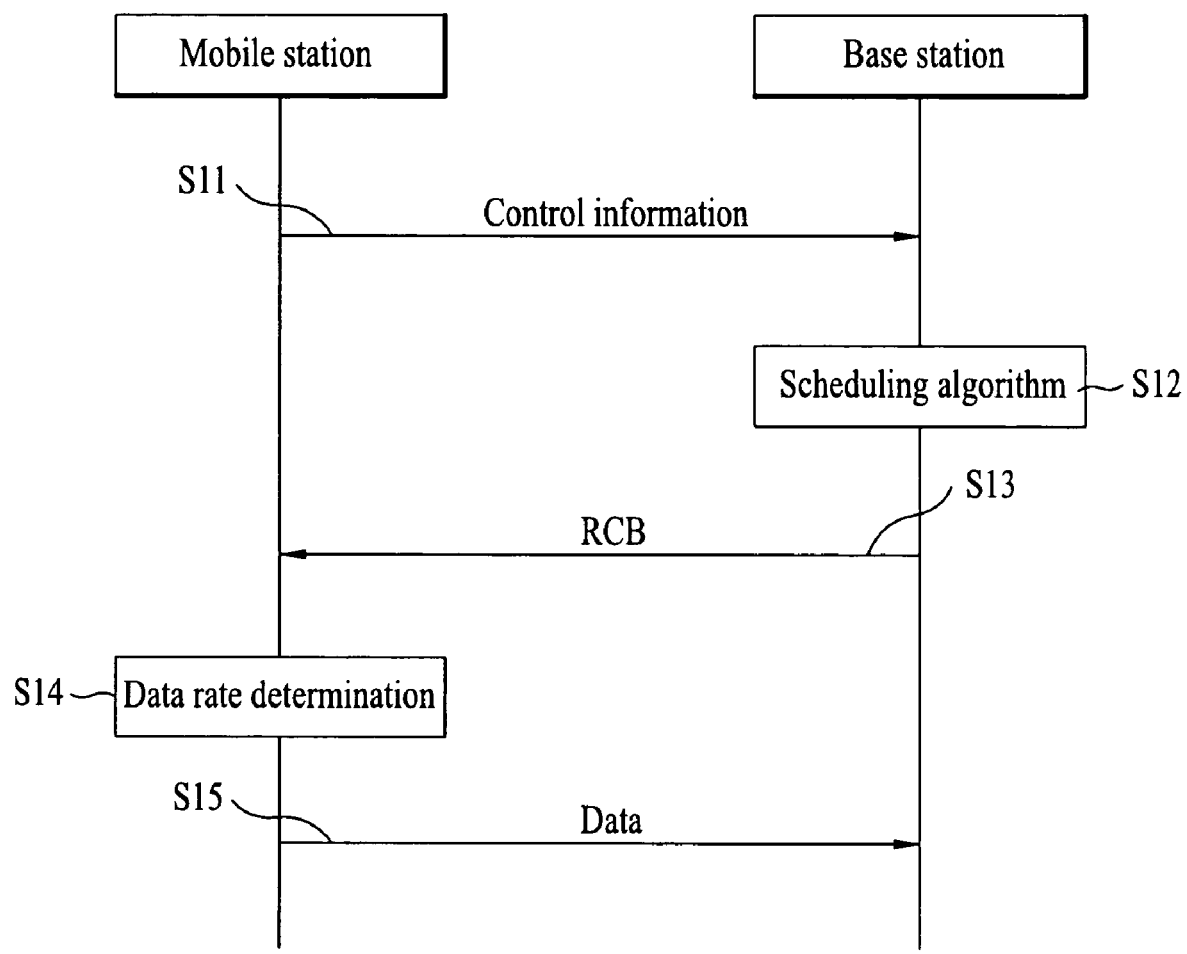
FIG. 3 is a flow diagram of a method of determining a reverse data rate according to the present invention.

FIG. 3 illustrates the overall procedure of a method of determining a reverse data rate according to the present invention.

As shown in FIG. 3, for a given frame of reverse traffic data, a mobile station uses a reverse control channel to transmit control information—specifically including data rate information and mobile station status information—to a base station in a step S11, which enables the base station to decode the frame received via a reverse traffic channel. The base station executes a scheduling algorithm in a step S12, which may follow any of a variety of known methods for optimizing communication resources for the current frame, based on the information received from a plurality of mobile stations. In doing so, the base station allocates a reverse-link data rate to each of the mobile stations of a given cell, i.e., sets a priority for each mobile station, to enhance throughput while maintaining a stable rise-over-thermal noise (RoT) in the reverse link. As a result of scheduling algorithm execution, the base station generates data rate control information for each of the corresponding mobile stations. Accordingly, a rate control bit (RCB) is transmitted to the mobile station in a step S13.

That is, the base station generates data rate control information for each mobile station of a cell and, once per frame, transmits the generated information over a forward control channel using a code-division or time-division transmission scheme. Essentially an instruction, the rate control bit of the data rate control information may be configured in one of two ways; the data rate may be incremented by an n-step or decremented by an m-step, or the data rate may be incremented by the n-step, decremented by the m-step, or held at the rate of the previous frame. The above step sizes are determined by signaling and, though preferably equal to one, may be any integer greater than or equal to one.

Figure 4:
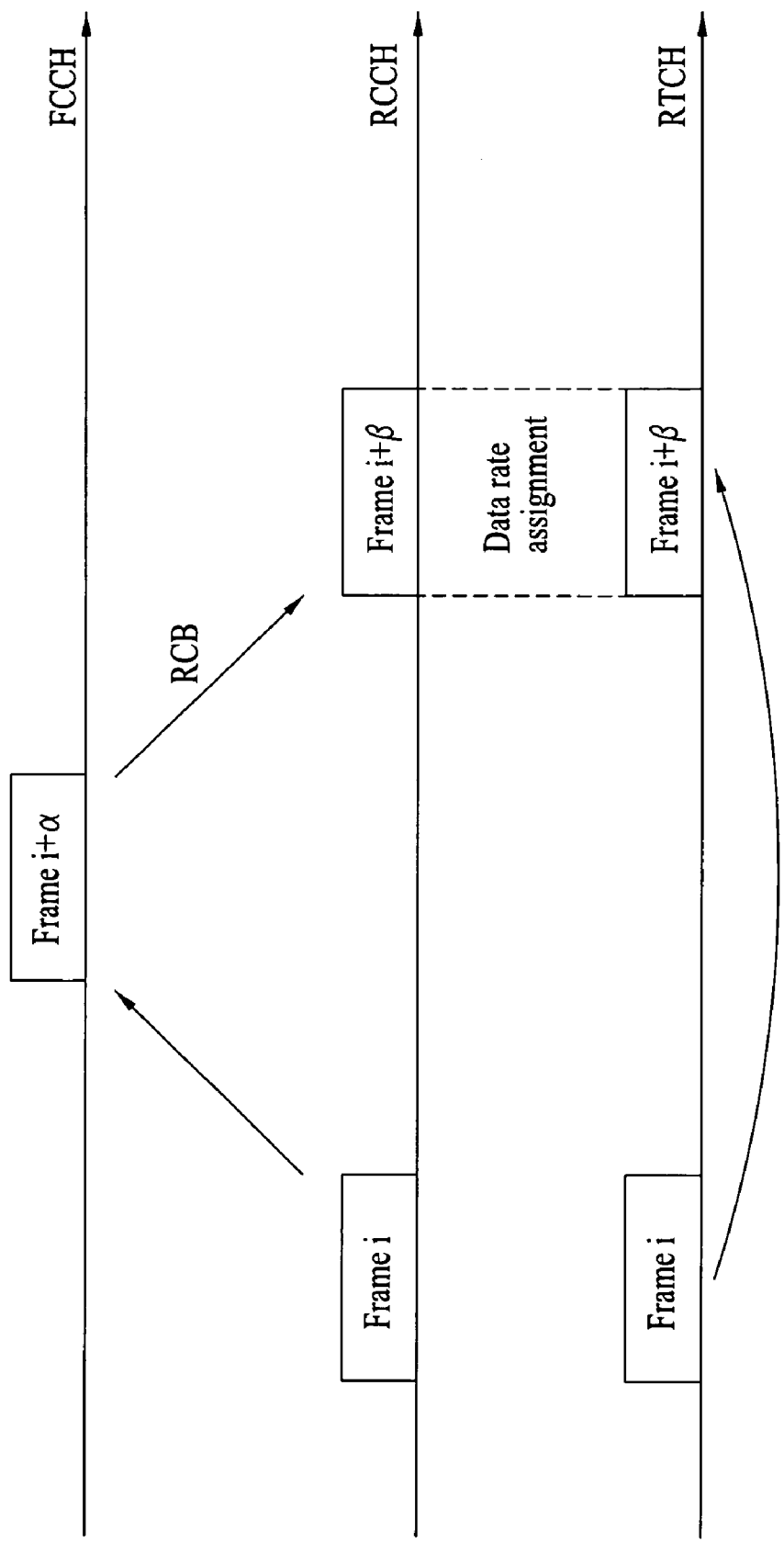
FIG. 4 is a timing diagram of a method of determining a reverse data rate according to the present invention.

Thereafter, before transmitting the traffic data to the base station in a step S15, the mobile station performs data rate determination in a step S14 by assigning to the current frame a maximum data rate, i.e., the highest rate permitting a tolerable frame error rate, based on the data rate control information transmitted from the base station. FIG. 4 illustrates a method of determining a reverse data rate in a mobile station executing the step S14 of FIG. 3, which notably differs from that of the related art method.

Referring to FIG. 4, the base station generates data rate control information on an ith frame of a reverse control channel (RCCH) based on information transmitted from the mobile stations within the cell, i.e., data rate information, mobile station status information, and the like. Then, at the $(i+\alpha)$th frame of the forward control channel (FCCH), the base station transmits the data rate control information to the corresponding mobile station, which calculates in the step S14 a maximum transmittable data rate to be assigned to the $(i+\beta)$th frame of the reverse traffic channel (RTCH) based on the data rate control information. The assigned data rate is a value equal to $\epsilon_{i+\alpha}D_i$ for every frame $i+\beta$, where $\epsilon_{i+\alpha}$ is a data rate transition ratio determined in accordance with the data rate control information of the $(i+\alpha)$th frame and where $D_i$ is the transmitted data rate of the ith frame. Accordingly, as indicated by the arcing arrow in FIG. 4, the transmitted data rate of the ith frame is referenced to determine the assigned data rate of the $(i+\beta)$th frame.

In brief, the data rate control information generated from the base station is provided based on the data rate transmitted $\beta$ frames earlier and the current mobile station status information. Hence, the corresponding mobile station applies the transition ratio, which is calculated based on the generated and transmitted data rate control information, to the earlier data rate to decide the data rate of the current frame for transmission.

The actual data rate of the traffic data transmitted is ultimately determined by taking the calculated maximum data rate as an upper limit and by considering an amount of data to be transmitted (buffer status) and the power available for the transmission on the reverse traffic channel. To determine the actually transmitted data rate, the assigned data rate is referenced in a lookup table, which is commonly stored in the mobile station and in the base station, and the reverse-link data rate of frame $i+\beta$ is conservatively selected from a prescribed list. In doing so, the mobile station refers to the data of the lookup table, which is a list of applicable data rates, locates the data rate transmitted at the ith frame, and applies one of the n-step increment, m-step decrement, and hold per the instruction of the data rate control information.

Therefore, in the method of determining a reverse data rate according to the present invention, the data rate of an $(i+\beta)$th frame of the reverse traffic channel depends on the data rate of an ith frame, whereby frames affected by the data rate transition can be considered as a number of time-division virtual channels, namely, $\beta$ virtual channels. Thus, the data rate transitions of the $(i+N\beta)$th, $(i+(N\beta+1))$th, ..., $(i+(N\beta+(\beta-1)))$th frames are independently determined. Here, N is a natural number representing a progression by $\beta$ frames. The independent nature of the data rate transitions of these frames enables their separation into $\beta$ virtual channels, thereby enabling the mobile station to efficiently manage data having $\beta$ qualities of services (QoS).

Figure 5:
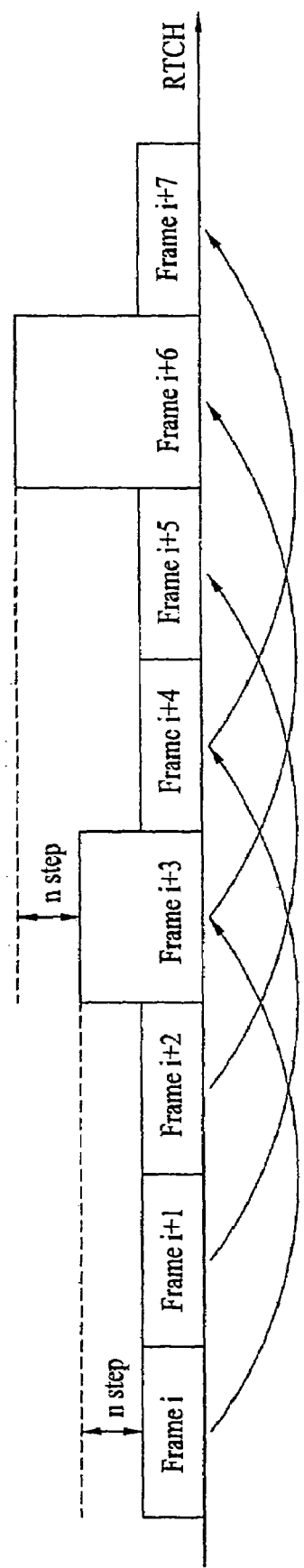
FIG. 5 is a diagram of an exemplary series of data rates determined for a reverse traffic channel of a mobile station adopting the method of FIG. 4.

FIG. 5 illustrates an exemplary series of data rates determined for a reverse traffic channel of a mobile station adopting the method of FIG. 4, where $\beta=3$. Here, it should be appreciated that the value of β corresponds to the number of whole frames resulting from the delay time caused by the generation and transfer of the data rate control information. As shown in FIG. 5, the assigned data rate of a frame i+3 is based on the transmitted rate of the ith frame, and the assigned data rate of a frame i+6 is based on the transmitted rate of the (i+3)th frame, whereby an n-step increment is applied to the data rate of each referenced frame. For the sake of simplification, a hold instruction is shown for each of the other two virtual channels, but any instruction may be applied in accordance with the data rate control information received for the corresponding frame. In any case, the assigned data rates of frames i+4, i+5, i+6, and i+7 are based on the transmitted rates of frames i+1, i+2, i+3, and i+4, respectively.

If the ACK/NACK delay time is β frames in a communication system supporting hybrid automatic repeat request (HARQ), i.e., if retransmission control information (i.e., an ACK/NACK message) and data rate control information are simultaneously received via the reverse control channel, the mobile station can achieve an efficient data rate determination by simply referring to the retransmission control information and simultaneously determining a retransmission data rate when a NACK message is received and determining a new transmission data rate when an ACK message is received.

Accordingly, the present invention considers the delay time required for the generation and transfer of data rate control information, reflects the current communication environment, and thereby determines an optimal data rate. The present invention may be adopted for traffic channels providing high transmission rates, for example, a reverse supplementary channel proposed by IS2000 Release D.

It will be apparent to those skilled in the art that various modifications and variations can be made in the present invention without departing from the spirit or scope of the invention. Thus, it is intended that the present invention embody such modifications and variations, provided they come within the scope of the appended claims and their equivalents.

What is claimed is:

1. A method of determining a data rate for traffic data to be transmitted from a mobile station to a base station in a mobile communication system, the method comprising:
   transmitting control information to the base station, the control information corresponding to the traffic data of an ith frame, the ith frame having a predetermined data rate;
   receiving, in response to the transmitted control information, data rate control information from the base station, the data rate control information including an instruction which indicates one of an n-step increment of data rate, an m-step decrement of data rate, or a hold of data rate, where n and m are integers greater than or equal to one; and
   determining a data rate of traffic data to be transmitted from the mobile station to the base station during an (i+β)th frame, by applying the instruction included in the data rate control information to the predetermined data rate of the ith frame, wherein β is an integer greater than one, wherein ith frame is a non-consecutive preceding frame relative to the (i+β) frame and wherein the n-step increment, m-step increment, or hold of data rate indicated by the instruction is applied relative to the data rate of the ith frame.

2. The method as claimed in claim 1, wherein β corresponds to a delay time measured in whole frames based on generation or transfer of the data rate control information.

3. The method as claimed in claim 2, wherein data transitions of (i+Nβ)th, (i+(Nβ+1))th, . . . , (i+(Nβ+(β−1)))th frames of the traffic data are independently determined, where N is a natural number representing a progression by β frames.

4. The method as claimed in claim 3, wherein frames affected by the data rate transition correspond to a number of time-division virtual channels.

5. The method as claimed in claim 4, wherein the number of time-division virtual channels is equal to β.

6. The method as claimed in claim 1, wherein the control information includes data rate information of the traffic data of the ith frame and status information of the mobile station.

7. The method as claimed in claim 6, wherein the status information of the mobile station indicates currently available traffic channel transmission power and currently remaining buffer capacity.

8. The method as claimed in claim 7, wherein the data rate control information is generated based on mobile station status information received from a plurality of mobile stations within a cell.

9. The method as claimed in claim 1, wherein, if the mobile communication system supports a hybrid automatic repeat request, the data rate control information is simultaneously transmitted together with retransmission control information.

10. The method as claimed in claim 9, wherein the retransmission control information is one of a NACK message and an ACK message.

11. The method as claimed in claim 1, wherein the control information is transmitted via a first channel and the traffic data is transmitted via a second channel.

12. The method as claimed in claim 11, wherein the first channel is a reverse control channel and the second channel is a reverse traffic channel.

13. The method as claimed in claim 1, further comprising determining a substantial data rate of the traffic data to be transmitted on the (i+β)th frame according to a data transmission capacity of the mobile station, by taking the determined maximum data rate as an upper limit.

14. The method as claimed in claim 13, wherein the data transmission capacity of the mobile station is determined by an amount of data to be transmitted and an available power for transmission of the traffic data.

15. The method as claimed in claim 1, wherein the data rate of traffic data to be transmitted from the mobile station to the base station is a maximum data rate.

* * * * *